Figure 1:
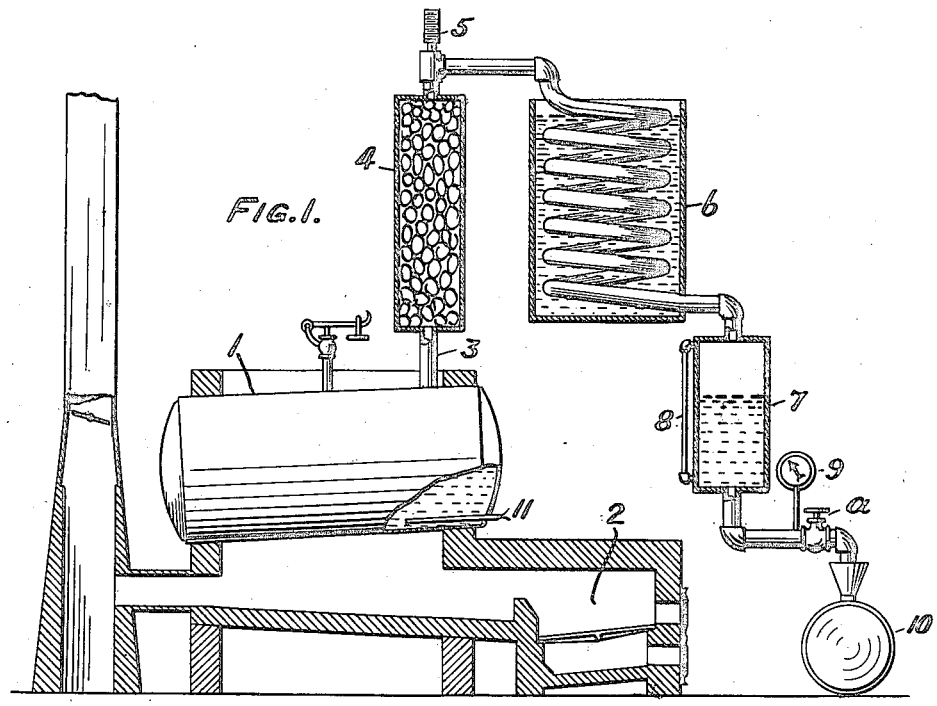

W. H. GARTLEY.
MANUFACTURE OF TOLUOL.
APPLICATION FILED MAR. 30, 1915.

1,225,237.

Patented May 8, 1917.

WITNESS

INVENTOR
William H. Gartley.
BY
Augustus B. Stoughton.
ATTORNEY.

UNITED STATES PATENT OFFICE.

WILLIAM H. GARTLEY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

MANUFACTURE OF TOLUOL.

1,225,237. Specification of Letters Patent. Patented May 8, 1917.

Application filed March 30, 1916. Serial No. 18,061.

*To all whom it may concern:*

Be it known that I, WILLIAM H. GARTLEY, a citizen of the United States, and a resident of Philadelphia, in the county of Philadelphia and State of Pennsylvania, have invented certain new and useful Improvements in the Manufacture of Toluol, of which the following is a specification.

The principal object of the present invention is to recover or obtain an increased quantity, yield or percentage of toluol from gas tar, street drip and similar liquid hydrocarbons resulting from gas making and like processes.

In processes of gas making the temperature rises very high, in some instances as high as 2000° F. or more, with the resultant formation of gas tar, street drip and the like, consisting of a hydro-carbon series infrequently encountered in the refining of oil whether of paraffin or asphalt base. The ordinary fractional distillation at atmospheric pressure of gas tar, street drip and similar hydro-carbons gives rise to products of which three are commercially identified as light oil, dead oil and pitch. The ordinary fractional distillation at atmospheric pressure of light oil gives rise to products, of which three are complex but are identified or commercially known as crude benzol, crude toluol and the crude tar naphthas. The substances referred to as crude tar naphthas are sometimes referred to as crude solvent, or crude heavy naphtha, and they are chemically a mixture largely of substances of the aromatic series, such for example, as benzene, toluene and xylene and higher boiling members of the aromatic series.

The quantity or fraction of toluol heretofore recovered or obtained from the naphthas by ordinary distillation is only approximately three per cent. I have increased the percentage of toluol recovered from three per cent. to approximately fifteen per cent. The attainment of this novel result is based upon the discovery that the application of pressure distillation to the so-called naphthas will produce crude toluol which is in addition to and can be saved and added to the crude toluol already produced by the old method, and a residue resembling, but heavier than, the naphthas from which the toluol was produced and which residue can be distilled at atmospheric pressure giving a residuum of coke or at least a very heavy residuum, and a distillate substantially resembling the original naphthas or naphtha fraction, which distillate, if desired, can be again subjected to pressure distillation so as to repeat the described operation and recover more toluol.

In the accompanying drawings I have illustrated apparatus that can be used for practising the invention.

Figure 2:
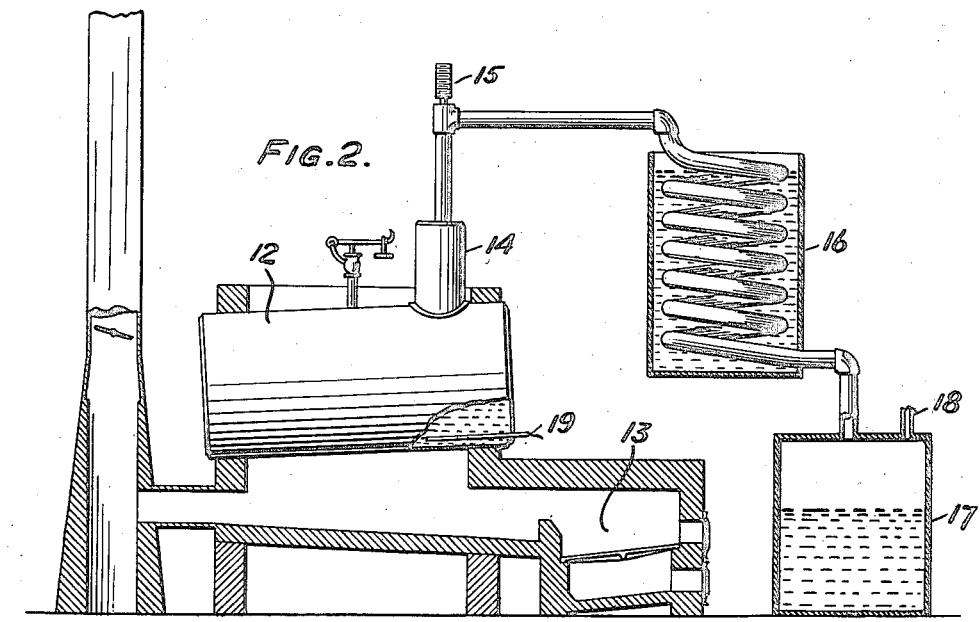

Figure 1, is a side view principally in section illustrating a pressure still, and Fig. 2, is a similar view illustrating an atmospheric still.

In the drawings, referring to Fig. 1, 1 is a still, 2 a furnace, 3 a vapor pipe, 4 a dephlegmator and "planer", 5 a thermometer, 6 a condenser, 7 a receiver, 8 a gage-glass, 9 a pressure gage, 10 a shipping drum and 11 a pyrometer.

Referring more particularly to Fig. 2, 12 is a still, 13 a furnace, 14 a still dome, 15 a thermometer, 16 a condenser, 17 a receiver, 18 a vent and 19 a pyrometer.

A further description will be given of the practice of the invention in connection with the apparatus chosen for illustration.

Naphthas of the kind above referred to are put into the pressure still, Fig. 1, and a fire is started in the furnace. The pressure in the still, as soon as vaporization commences, is maintained at about thirty-five pounds per square inch. The result of this pressure is to confine in the liquid, vapors that otherwise would have been set free at the temperature of the liquid in the still. During the process the temperature of the liquid increases, but when under the pressure of about thirty-five pounds per square inch, the temperature of the liquid in the still arrives at about 260° F., destructive distillation commences or proceeds with change of the molecular composition of the naphthas and with the evolution of gas, crude toluol and the deposit in the residue in the still of carbon being set free, in such molecular change. As the temperature rises, this production of crude toluol, due to the breaking down of the molecules of the naphtha in the still, continues until the temperature rises to about 460° F., always maintaining the pressure at about thirty-five pounds per square inch. The figures above given are descriptive and are not given with the idea of confining the invention to them.

The distillate is crude toluol and it may be recovered in the drum 10. The valve a, is a means for creating and maintaining the desired pressure and the instruments 5, 8, 9 and 11, afford means for ascertaining the conditions that exist in the still and its accessories. There is left in the still a residue which is somewhat heavier than the naphtha. This residue is transferred from the still 1 to the still 12, Fig. 2, and is subjected to distillation at atmospheric pressure. The distillate may be collected as at 17 and it resembles naphtha, but is somewhat heavier. The residuum in the still 12 is coke, or if the distillation is not carried far enough to result in coke, it is a very heavy residuum. If desired the distillate from the receiver 17 may be put back into the pressure still 1 and again subjected to distillation in substantially the manner above described, producing more toluol, and more of the described residue which can be treated in the still 12 as has been described, and these steps can be repeated as often as desired or until the recovery of toluol is insufficient to warrant the repetition.

In the operation of the still 1 there is an evolution of gas and a deposit of carbon which indicate a breaking down or molecular rearrangement of the constituents of naphtha, which may be called destructive distillation. The distillation in the still 1 is continued as long as the recovery of toluol warrants. It may be said that the naphtha which is introduced into the still 1 has a higher boiling point and a lower specific gravity than the distillate obtained from the still 1 which has a lower boiling point and a higher specific gravity. The naphtha is from 30° to 35° Baumé and the residue about 28° Baumé. It may aid the description to say that in in the operation of the still 1, the naphtha made up of members of the aromatic series which have formulæ $C_8H_{10}$ or $C_9H_{12}$ is converted into the material which has been referred to as the distillate having a formula $C_7H_8$. Additionally it may be said that in the still 1 there is a conversion of a part of the naphtha into toluol, as well as the production of the residue above referred to, which boils at a higher temperature than the original naphtha. The distillate recovered in the receptacle 17 has a lower boiling point than the residue that was put into the still 12.

The fractional distillation of gas tar and of the light oil fraction thereof is well understood and I have not illustrated a special apparatus for carrying on that distillation. However, it may be said that such distillation may be carried on in a still substantially like that shown in Fig. 2.

In the claims the words "gas tar" will be used to describe not only gas tar but also street drip and similar heavy hydro-carbons, such as result from gas making processes, and the word "naphtha" will be used to describe the substance commercially called tar naphtha, either solvent naphtha or heavy naphtha, and the word "toluol" will be used to describe that substance in its commercial sense which is intended to mean crude toluene, and in the same way the word "light oil" is used in its commercial sense as indicating the lighter fraction of the distillation of tar as distinguished from the dead oil and pitch.

What I claim is:

1. In the process of making toluol the method which consists in subjecting the naphtha of gas tar distillation to destructive distillation in a pressure still at a pressure exceeding about thirty-five pounds per square inch, thereby converting some of it into toluol recoverable as a distillate and leaving a residue that boils at a higher temperature than the naphtha, substantially as described.

2. In the process of making toluol the method which consists in subjecting the naphtha of gas tar distillation to pressure distillation at a pressure exceeding about thirty-five pounds per square inch, thereby converting some of it into toluol recoverable as a distillate and leaving a residue that boils at a higher temperature than the naphtha, distilling this residue at atmospheric pressure and recovering a distillate with lower boiling point than the residue and leaving coke or heavy hydro-carbon in the still, and treating the last named distillate by pressure distillation in repetition of the process, substantially as described.

In testimony whereof I have hereunto signed my name.

WILLIAM H. GARTLEY.

Witnesses:
O. B. EVANS,
CHARLES J. O'DONNELL.